(12) United States Patent  
Bleszynski et al.

(10) Patent No.: US 7,006,505 B1  
(45) Date of Patent: Feb. 28, 2006

(54) MEMORY MANAGEMENT SYSTEM AND ALGORITHM FOR NETWORK PROCESSOR ARCHITECTURE

(75) Inventors: Ryszard Bleszynski, Saratoga, CA (US); Man D. Trinh, San Jose, CA (US)

(73) Assignee: Bay Microsystems, Inc., San Jose, CA (US)

( * ) Notice: Subject to any disclaimer, the term of this patent is extended or adjusted under 35 U.S.C. 154(b) by 784 days.

(21) Appl. No.: 10/035,571

(22) Filed: Oct. 23, 2000

Related U.S. Application Data

(60) Provisional application No. 60/242,831, filed on Oct. 23, 2000.

(51) Int. Cl.  
*H04L 12/56* (2006.01)

(52) U.S. Cl. ............. 370/395.72; 711/153; 710/28
(58) Field of Classification Search ............. 370/395.7, 370/395.72, 395.71, 378, 379, 381, 382, 370/383; 711/153; 710/38, 28, 36
See application file for complete search history.

(56) References Cited

U.S. PATENT DOCUMENTS

| | | | | |
|---|---|---|---|---|
| 3,702,006 | A | * | 10/1972 | Page ........................... 718/105 |
| 4,633,387 | A | * | 12/1986 | Hartung et al. ............. 718/105 |
| 5,394,397 | A | * | 2/1995 | Yanagi et al. ............... 370/390 |
| 5,539,747 | A | * | 7/1996 | Ito et al. ...................... 370/235 |
| 5,649,217 | A | * | 7/1997 | Yamanaka et al. ............ 710/52 |
| 5,859,849 | A | * | 1/1999 | Parks .................... 370/395.72 |
| 5,905,725 | A | | 5/1999 | Sindhu et al. |
| 5,948,081 | A | * | 9/1999 | Foster ........................... 710/40 |
| 6,021,086 | A | * | 2/2000 | Joffe ...................... 365/230.05 |
| 6,055,234 | A | * | 4/2000 | Aramaki ................ 370/395.72 |
| 6,122,274 | A | | 9/2000 | Kumar |
| 6,249,524 | B1 | * | 6/2001 | Moriwaki et al. ........... 370/412 |
| 6,415,366 | B1 | * | 7/2002 | Chen et al. .................. 711/158 |
| 6,510,161 | B1 | * | 1/2003 | Trevitt et al. ............... 370/412 |
| 6,697,362 | B1 | * | 2/2004 | Akella et al. ............... 370/389 |
| 2001/0010692 | A1 | * | 8/2001 | Sindhu et al. .............. 370/395 |

FOREIGN PATENT DOCUMENTS

EP        0374337 A1    6/1990

* cited by examiner

*Primary Examiner*—Alpus H. Hsu  
*Assistant Examiner*—Clemence Han

(57) ABSTRACT

An embodiment of this invention pertains to a system and method for balancing memory accesses to a low cost memory unit in order to sustain and guarantee a desired line rate regardless of the incoming traffic pattern. The memory unit may include, for example, a group of dynamic random access memory units. The memory unit is divided into memory channels and each of the memory channels is further divided into memory lines, each of the memory lines includes one or more buffers that correspond to the memory channels. The determination as to which of one or more buffers within a memory line an incoming information element is stored is based on factors such as the number of buffers pending to be read within each of the memory channels, the number of buffers pending to be written within each of the memory channels, and the number of buffers within each of the memory channels that has data written to it and is waiting to be read.

44 Claims, 7 Drawing Sheets

MEMORY MANAGEMENT SYSTEM AND ALGORITHM FOR NETWORK PROCESSOR ARCHITECTURE

This application claims the benefit of U.S. Provisional application No. 60/242,831, filed Oct. 23, 2000.

BACKGROUND OF THE INVENTION

1. Field of the Invention

The present invention relates in general to the elimination of packet and control memory bottlenecks in communication networks and more specifically to a Network Processor (NP) architecture. The architecture and algorithm incorporated in the Network Processor Integrated Circuit (IC) of the invention provide orders of magnitude faster performance and the scalability needed to meet the/explosively-increasing demand for bandwidth.

2. Background Information

Almost all communications equipment uses one or more network processors. Communications equipment includes but is not limited to: high-speed routers, switches, intelligent optical devices, DLSAM, broadband access devices, voice gateways, etc. The equipment may deploy the NP in a centralized or distributed manner. Distributed NP is popular for high speed and intelligent communications equipment. For lower and mid-range equipment, centralized NP is very attractive since this will keep the equipment price very low. In complex, high-speed intelligent broadband equipment, the NPs (such as those manufactured by Intel or Lucent) are distributed and each line card may contain one or more NPs. FIG. 1 illustrates the NP physical location within the line card and logical functions within the Networking stacks.

In a typical line card, the fiber-optic cable is connected to the optical module. The other end of the fiber optic line typically connects to an external router or another communications device. Among other functions, the optical module converts the optical signal into an electrical signal. The optical module presents the electrical signal to the framer. The framer performs functions such as: framing, error checking and statistical gathering. The framer provides the framed information to the optional classifier. The classifier performs a flow classification function. The classifier is an optional function. Most equipment does not require classification beyond layer three or four and most network processors perform at least up to layer three or four. The network processor processes the information and forwards it into the appropriate line card within the system's backplane using the switch fabric. Logically, the optical module and framer perform layer one of the OSI stack, whereas the NP and optional classifier handles layers 2 through 7. Processing intelligence, power and bandwidth capacity are the biggest differentiation factors between Network Processors.

Among the single biggest limiting factor for NPs to scale and meet increasing Internet bandwidth demand is Moore's law. Moore's law limits the advancement in semiconductor process technology to 18 months in order to achieve a 100% performance improvement. Doubling every 18 months is far below the Internet bandwidth demand, which doubles every four to six months. As of today, early generation network processors cannot scale by 4 or 16 within a two to three year time window. Overcoming Moore's law is a non-trivial process. FIG. 2 illustrates Moore's law versus Bandwidth demand curve.

The current techniques in network processor architectures are bounded by Moore's law. In general there are three approaches to NP architectures: Multiple RISC, Configurable hardware and a mixture of RISC and hardware. The RISC Architecture and Instruction Set was created decades ago for devices geared toward human to machine interaction. Network devices are not human to machine devices. They are machine-to-machine devices. In other words, they are communicating to high-speed machines and not to humans. Multiple RISC engines within the data path of networking equipment will not meet the required bandwidth demand. Moore's law is one limiting factor. Another severe limiting factor is the complexity of the software compiler, scheduler and/or kernel to efficiently control and maximize the processor's operation. Creating a mini operating system is not the solution to the explosive demand in bandwidth, especially when Moore's law (hardware) cannot even meet the demand.

Configurable hardware results in the highest-performance processors. The simple software interface avoids any performance degradation. Eliminating any software within the information path and replacing it with configurable gates and transistors significantly boosts the performance of the Network Processor. At the gate level, without any creativity within the architecture, Moore's law still bounds the performance advancement of Network Processor architecture.

A mixture of multiple RISCs and configurable hardware machines has two different flavors. The first flavor uses the RISCs in the data path and the other one is to have the RISC processor in the control path. Traditionally, RISC processors in the control path have been limited to those external to the NP.

In addition to the processing capability of the Network Processor, another critical bottleneck in the Network Processor architecture is the memory throughput for the payload buffer. Memory technology advancement is also bounded by Moore's law. Today's generation of store and forward network processors use a single hierarchy memory organization. Bandwidth may be increased by increasing the width of the memory bus. Increasing the information width of the packet memory bus, however, only decreases the actual memory throughput for packet sizes smaller than the bus width because of the additional processing overhead.

FIG. 3 illustrates a typical memory hierarchy within a computer system using either a RISC or CISC CPU.

Due to the principle of locality, the linear multilevel memory hierarchical scheme of FIG. 3 works very well in a CPU architecture. The CPU contains very high speed registers for immediate access. These registers are high-speed memory internal to the CPU providing the CPU with very high-speed single cycle access to the information. The cache is a small piece of memory and has a slightly slower access time compared to the registers. As the memory moves away from the CPU, the storage capacity increases and the access time decreases.

Caching theory works well in the computer architecture, but, unfortunately, due to the non-deterministic nature of network traffic, caching does not work well for Network Processors. The principle of locality does not apply in networking.

Therefore, it is desirable to have a system and method to efficiently access a memory unit while processing network traffic.

SUMMARY OF THE INVENTION

The present invention provides novel techniques for balancing memory accesses to sustain and guarantee a desired internet bandwidth (line rate) demand under any traffic pattern using low cost DRAM. Among other reasons, Network Processor advancements in meeting the explosively-increasing demand requirements for Internet bandwidth cannot rely on traditional memory locality principles. In particular, the technique of the present invention provides a novel traffic analyzer and memory bandwidth-balancing algorithm that will maximize aggregate memory bandwidth using low cost commercial DRAM memory, and enable true scalability for NPs and advancement independent of improvements in memory capabilities and Moore's law.

According to the invention, systems and methods are provided for maximizing the memory throughput by dividing the memory into sub-channels. The memory hierarchy is a single level as opposed to the linear multilevel approach used in computer systems. Each channel may consist of single or multiple banks of DRAM and have a 64-bit wide information path. The algorithm can be applied to channel granularity other than 64-bits. Due to the long latency of low cost DRAM, it can be mathematically proven that four individual 64-bit wide memory channels provide significantly better performance than a single 256-bit wide memory, especially for smaller packet sizes. FIG. 4 illustrates a top-level block diagram for the Memory Management Subsystems of the present invention.

The bandwidth management unit in FIG. 4 resides within the NP. The framer or classifier not shown in the figure is located between the fiber optic line and the NP. Each fiber line connects to one or more external routers or another communications device. As each packet or cell arrives, it is temporarily stored within the ingress FIFOs of Input Output Unit (IOU) 400. A Bandwidth Management Unit (BMU) consists of a traffic analyzer 401, a bandwidth balancer algorithm 402, a resource manager 403 and payload channel FIFOs 404. (To clarify the figure, please note that packets do not actually pass through the traffic analyzer, the bandwidth balancer or the resource manager.) The traffic analyzer analyzes the traffic by using counters to measure the depth level of the payload channel FIFOs 404. The count values are used by the bandwidth balancer to apply the balancing algorithm. The bandwidth balancer algorithm balances the traffic load across the multiple channels. The resource manager interfaces with the buffer management unit 406 for pointer allocation and recycling.

The payload channel FIFOs on the memory side provide additional temporary storage to compensate for latencies inherent within the DRAM memory systems. As illustrated in FIG. 4, the memory channels may consists of two or more channels. Each channel bus width used in this example is 64-bits wide. The algorithm may also, for example, be applied to channel bus widths of 2 to n where n is a positive integer.

In a store and forward architecture, network traffic arrives from the line side and the NP temporarily buffers the information in the memory side. This buffering is necessary to provide the tolerance needed against network congestion and to process traffic engineering and forwarding functions to determine the next hop destination of the packet data. After the network processor determines the destination, the traffic leaves the processor from the memory into the line side. In this example the buffer granularity is 64-bytes. The present invention can be applied to buffer size other than 64-bytes.

The present invention guarantees and sustains a line rate of, for example, 10 Gbps using four memory channels at a memory bus frequency of 166 MHz. Increasing the frequency to 200 MHz, the algorithm guarantees and sustains up to 20 Gbps of line rate. With 6 channels at 266 MHz, 40 Gbps of usable memory bandwidth is achievable. These numbers apply to packet sizes of 40-bytes or greater.

For the example here, four channels and a 64-byte buffer size are used. In an ideal scenario and the simplest case, when a packet or cell arrives, each 64-byte chunk is stored in one memory channel in a sequential manner. In particular, the first 64-byte goes to channel one, and the next one goes to channel two and so forth. This simplest case works fine if the outgoing (egress) traffic pattern is deterministic. Due to the non-deterministic outgoing traffic pattern experienced in real-world networks, however, the memory channels may not be balanced and thus the aggregate memory bandwidth will fall below the line rate. With unbalanced memory accesses, one or two channel swamp may occur and the line rate cannot be sustained or guaranteed. This is true since each channel provides significantly less bandwidth than the line rate requirement. In other words, because different packet streams are read out at different rates due to the demands of different-quality services (e.g., DSL, T1, etc.), these varying demands will affect each channel differently and generally cause the rate of reading an information unit from one network memory channel to be different from the reading rates of the other memory channels. The non-deterministic nature of the reading rate makes it particularly important to the determination of traffic flow.

According to an aspect of the invention, a method is provided to analyze the incoming and outgoing traffic patterns. The method, a traffic analyzer, analyzes incoming and outgoing traffic by monitoring the depth level of the FIFOs. In one embodiment, the traffic analyzer uses counters to measure the FIFO depth level.

In another aspect of the invention, an algorithm is provided to intelligently determine the channel selection for storing the incoming traffic. The algorithm balances the channels appropriately depending on the incoming and outgoing traffic patterns. The algorithm allocates a memory line by fetching the corresponding pointers for the line (which, for example, may consist of four 64-byte buffers) from the buffer management unit. A memory line may consist of two to N buffers, each of which may be assigned to a channel. In the example, the algorithm fetches four pointers, one for each buffer. Under severe traffic patterns, the algorithm includes intelligence to sacrifice one or more 64-byte buffers without even using the buffer space in exchange for a new line. The new line consists of four 64-byte buffers and thus increases the channel selection choice.

DESCRIPTION OF THE SPECIFIC EMBODIMENTS

Figure 1:
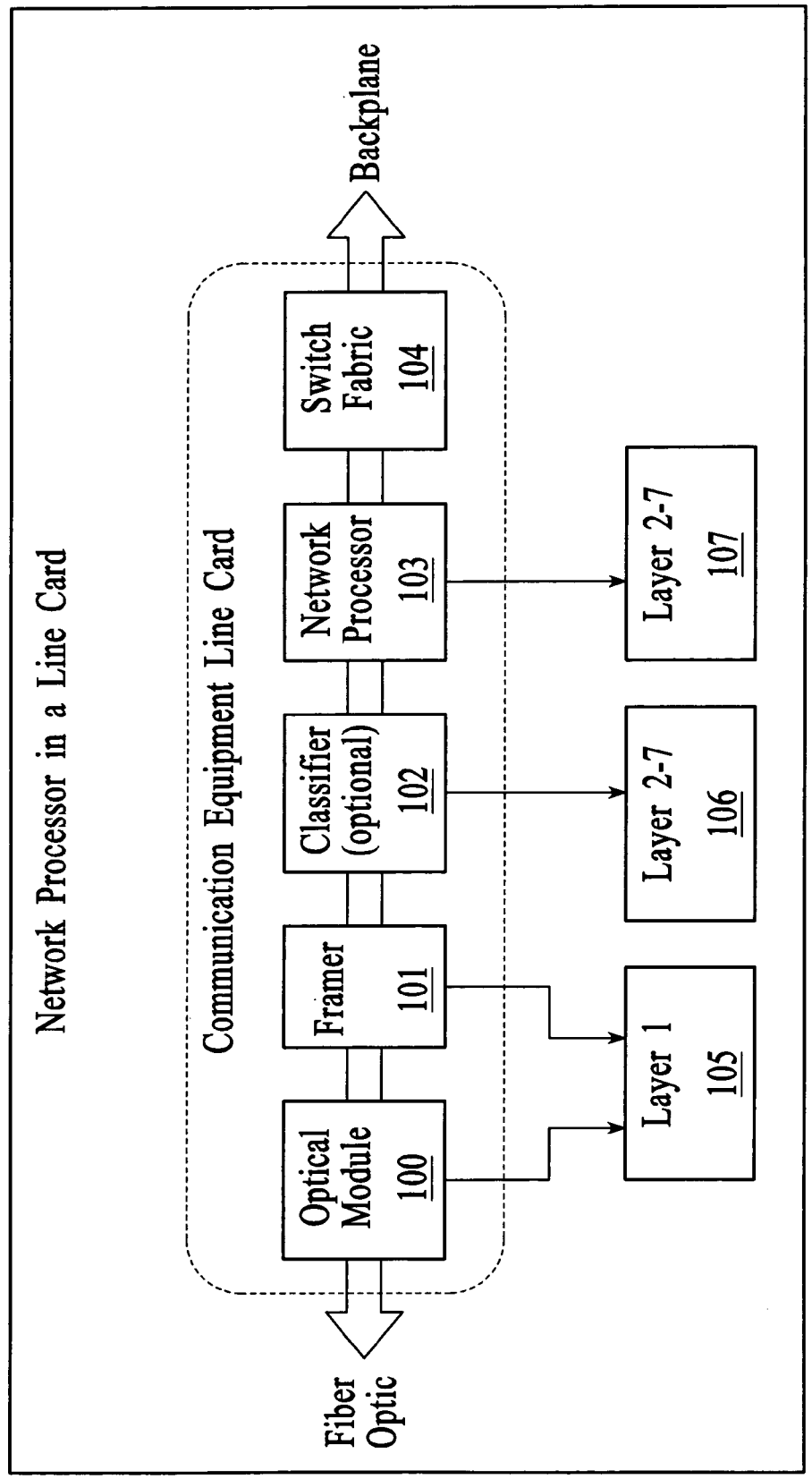
FIG. 1 illustrates a prior art line card and its components.
Figure 2:
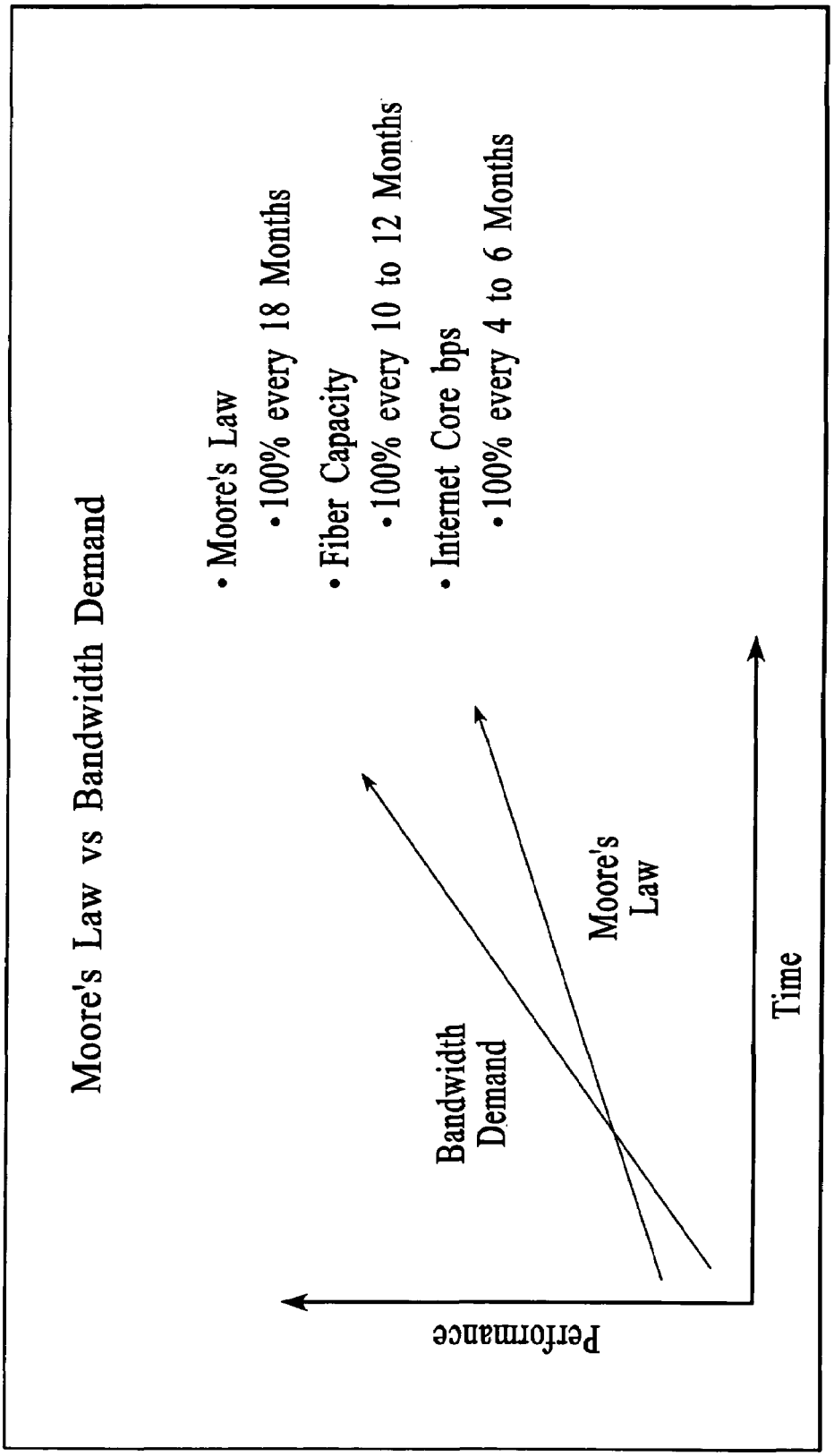
FIG. 2 illustrates Moore's Law versus the Internet bandwidth demand curve.
Figure 3:
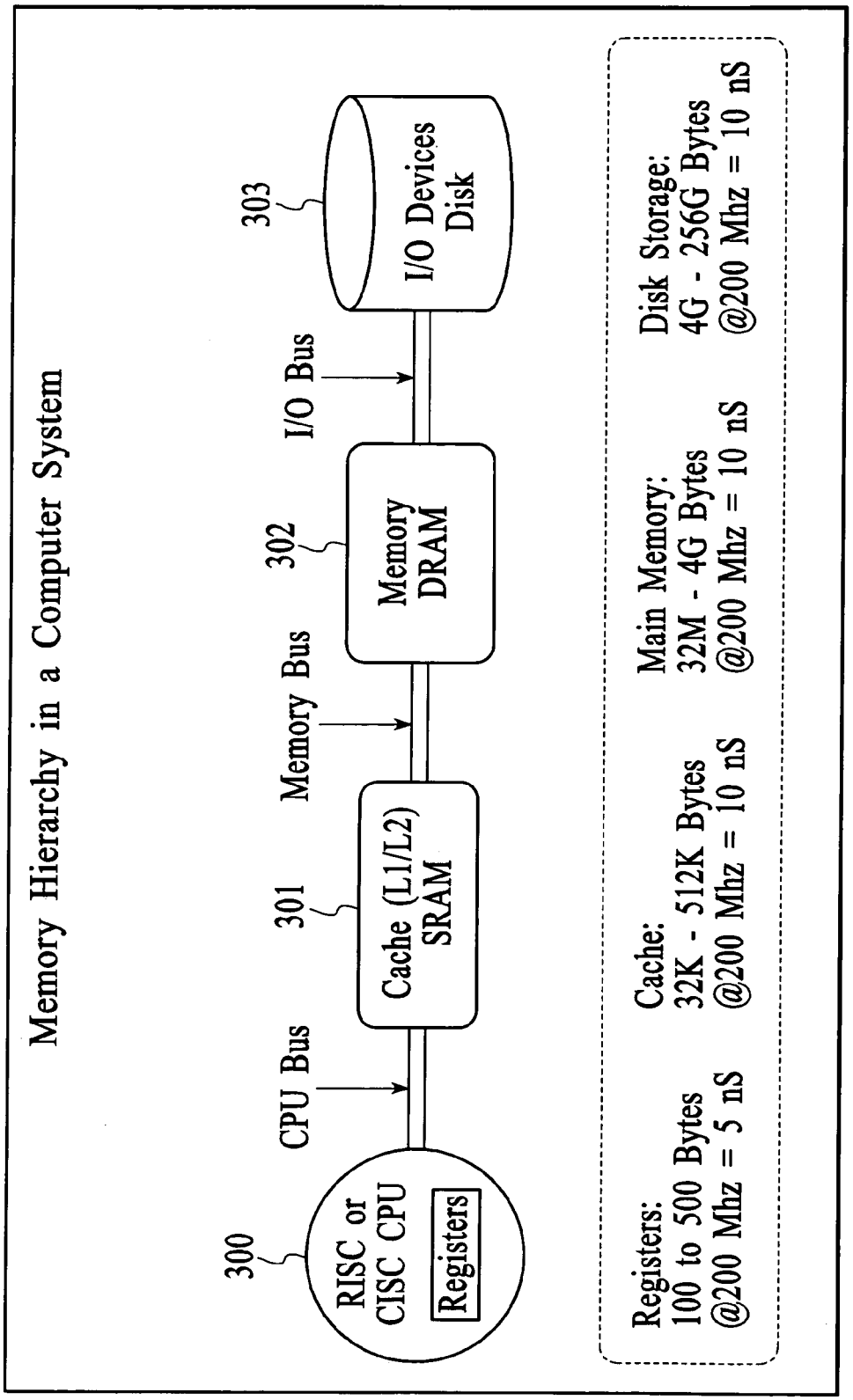
FIG. 3 illustrates a prior art multilevel memory hierarchy within a processor.

The present invention provides a system and method for controlling accesses to a memory, wherein the memory is divided into two or more memory channels. The memory is addressed line by line. Each memory line is divided into buffers, each of which may be assigned to a corresponding channel. (In some instances, a buffer is not assigned to a channel if it is sacrificed, as described below.) A buffer is considered to be assigned to a channel when it is permitted to store data in that memory channel. Each memory line is pointed to by a line pointer, and each buffer is pointed to by a channel pointer. Using a bandwidth balancing algorithm of the invention, the invention selects into which memory channel an information unit is to be stored. The information unit may be, for example, a complete packet if the size of the buffer can accommodate the entire packet, or a portion of a packet, if the buffer is only large enough to accommodate a portion of the packet. The information unit may also be, for example, an ATM cell.

The memory may be DRAM for storing data in a network processor. Each memory channel may comprise one or more banks of DRAM. While the data is stored in the memory, the network processor or other communications device determines, among other things, to which destination (e.g., a next hop router) the data should be sent.

The bandwidth balancer algorithm determines channel selection based upon load parameters, such as, for example, parameters relating to incoming and outgoing traffic for a channel, or, more particularly, the number of currently pending read and write requests and the active buffer count for each one of the four channels. In one embodiment (with no buffer sacrifice option), the BBA (Bandwidth Balancer Algorithm) will select the channel for the incoming cell, packet or packet segment using the following order of criteria:

1. Of the unoccupied channels in a line of memory, the channel with the lowest number of read requests is selected because a read request has the highest priority.
2. If there is more than one available channel within the line with the lowest number of read requests, then, of those channels, the channel with the lowest number of write requests is selected.
3. If the number of write requests pending for those channels is the same, then of those channels, the channel with smallest number of active buffers is selected. (A buffer is active if it stores data to be read out.) This criterion is based on a statistical prediction related to the fact that the channel with the higher number of active buffers will eventually generate more reads from that channel.
4. If all the channels determined by 1, 2 and 3 above have the same number of active buffers, then channel with a smallest ID is chosen.

In a store and forward architecture, such as that of the present invention, the information stored in the memory will eventually be read out for forwarding or discarding. Based on this fact, the method in the present invention uses counters for each channel to keep track of the number of buffers pending to be read, pending to be written, and active. Each channel uses three counters, pending read request (PRR), pending write request (PWR) and active buffer (AB) count as illustrated in FIG. 5.

Figure 5:
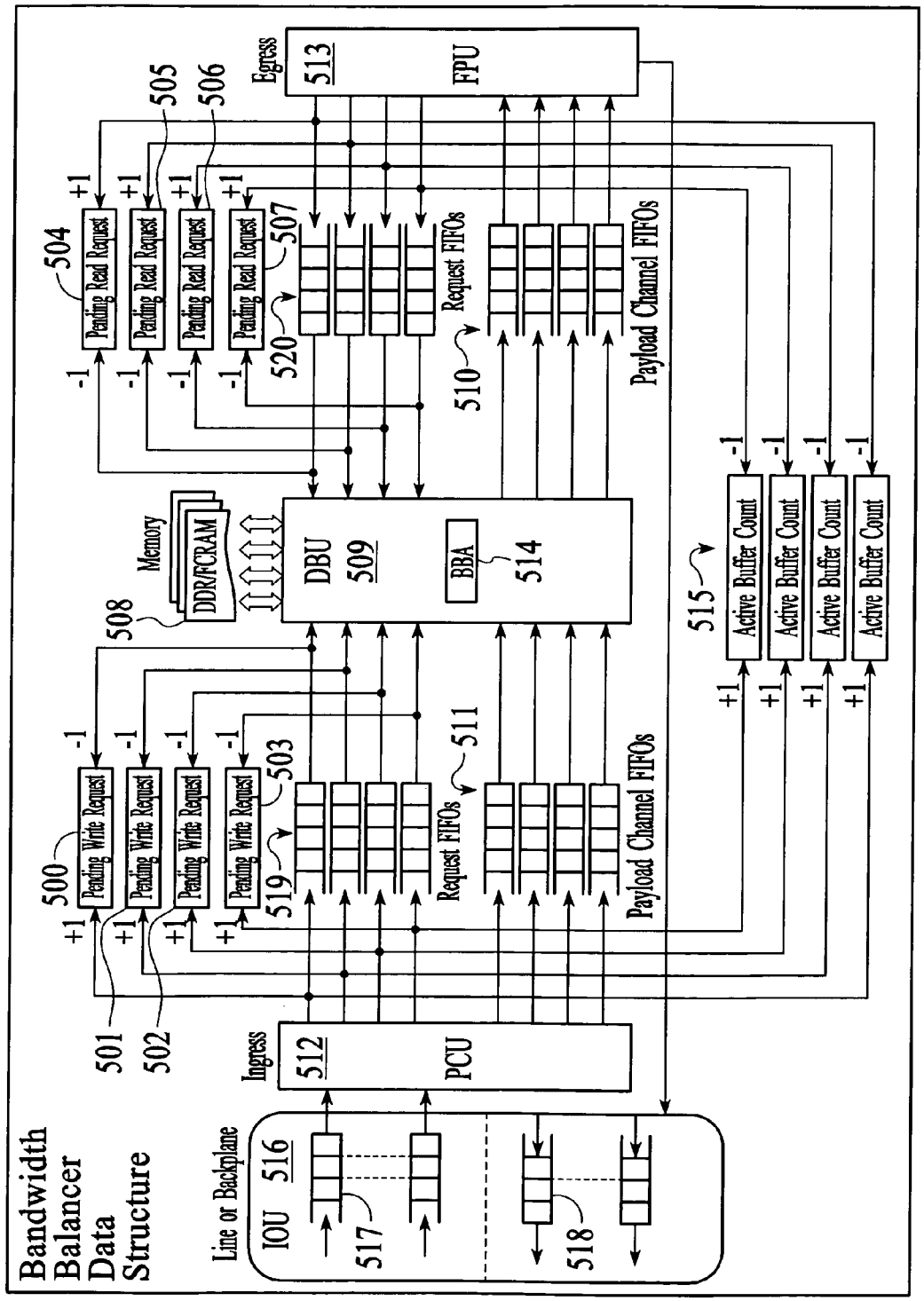
FIG. 5 illustrates an embodiment of a network processor according to the present invention.

In FIG. 5, the Policy Control Unit (PCU) 512 resides within the NP. Among other functions, the PCU performs functions such as usage parameter control (UPC) on information units (e.g., packets) arriving on the ingress line FIFOs 517. When the PCU completes its operations on an incoming cell or packet segment, the PCU initiates a write request to the Data Buffer Unit (DBU) 514 to write data into the memory 508. As explained in detail below, the BBA within the DBU selects the memory channel into which the information unit is to be stored. Each channel in memory 508 corresponds to a write request (control) FIFO 519 and associated incoming payload (data) channel FIFO 511. The PCU transmits the write request to the DBU through the request FIFO 519 corresponding to the selected memory channel, and temporarily stores the information unit in the incoming channel FIFO 511 corresponding to the selected memory channel before the information unit is written into the selected memory channel. The reason request and payload channel FIFOs are used to store requests and data, respectively, is that accesses to DRAM are subject to non-deterministic latencies.

Among other actions, the Forwarding Processing Unit (FPU) 513 performs a forwarding function, including calculation of the next destination (e.g., next hop). When the FPU completes its operations for an outgoing cell or packet segment, the FPU initiates a read request to the DBU to read data from the memory 508. Each channel in memory 508 corresponds to a read request (control) FIFO 520 and an associated outgoing payload (data) channel FIFO 510. The FPU transmits the read request to the DBU through the read request FIFO 520 corresponding to the channel storing the requested information unit. After the DBU reads the information unit from a buffer in memory, the information unit is stored in an outgoing payload channel FIFO 510 corresponding to the channel from which the information unit came. The information unit is then transferred to an egress line FIFO 518, after which the information unit is forwarded to its next destination.

When the PCU generates a write request the method increments the pending write request counter value by one. When the DBU services the write request (moves data from the incoming payload channel FIFO to a buffer in memory), the method decrements the pending write request counter (500, 501, 502 or 503) value by one. When the FPU generates a read request the method increments the pending read request counter (504, 505, 506 or 507) value by one. When the DBU services the read request (moves data from a buffer in memory to an outgoing payload channel FIFO), the method decrements the pending read request counter value by one. When the PCU generates a write request the method increments the active buffer counter 515 value by one. When the FPU generates a read request the method decrements the active buffer counter 515 value by one.

One of ordinary skill in the art will recognize that the present invention is not limited to using the exemplary counters described herein, but can use any technique to measure the load on the memory channels.

FIG. 5 illustrates the counters used for the method in this invention.

Figure 7:
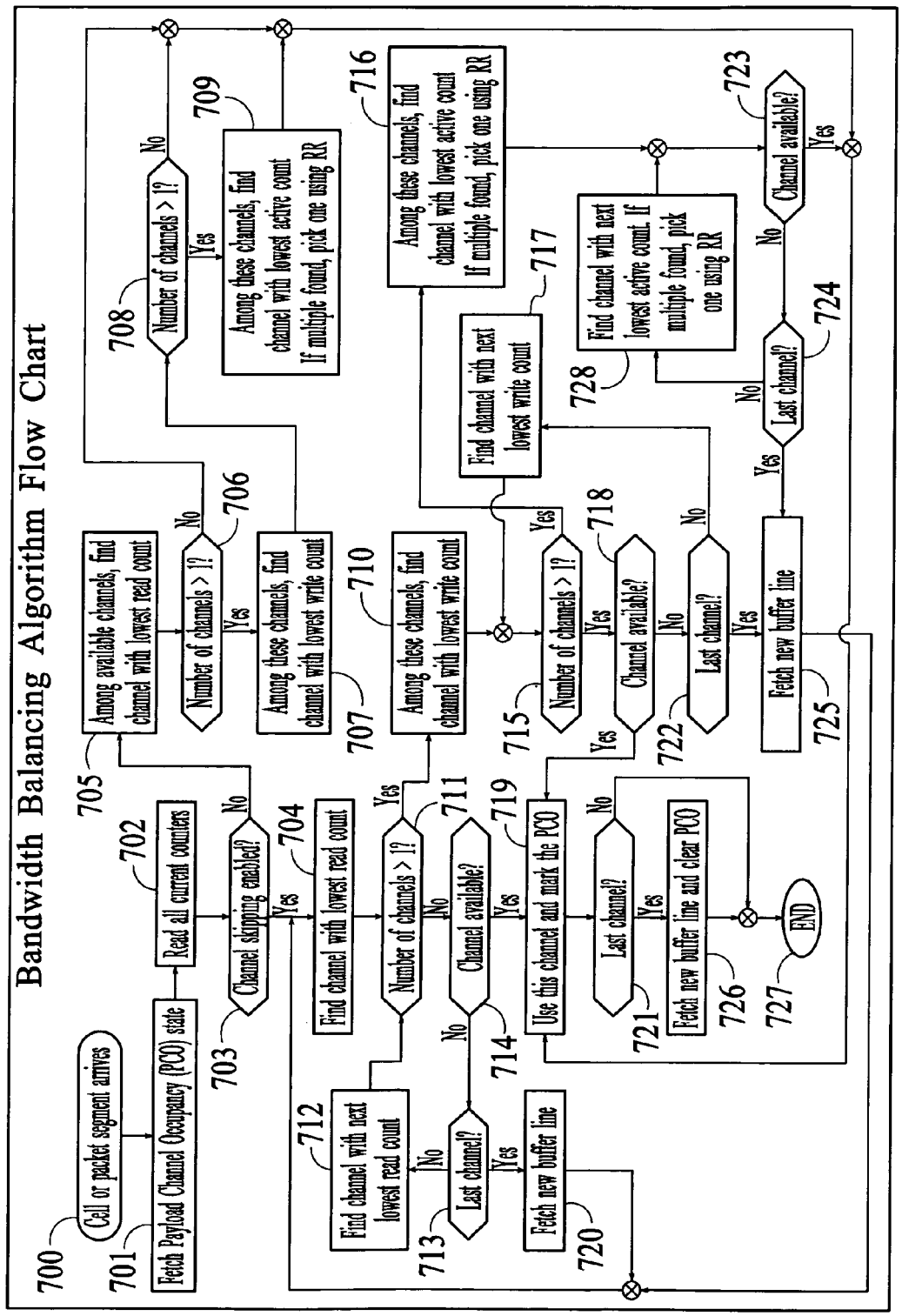
FIG. 7 illustrates an embodiment of a bandwidth balancing flowchart according to the present invention.

For four channels, the method uses 12 counters. One memory line consists of four 64-byte buffers. When the resource manager fetches a pointer, the buffer management unit provides a line pointer. The resource manager fetches a new line pointer when the BBA requires a new line to be fetched, as indicated in FIG. 7.

The line pointer points to a memory line which consists of four buffers, each of which may be assigned to a channel. Each time a 64-byte quantity of information is ready to be stored, the BBA selects from among the four channels. The PCU maintains state information using a field called the Payload Channel Occupancy (PCO) to identify which of the four channels are occupied. For example, if the buffers in a line corresponding to channels 1 and 3 are occupied, the PCO vector for that line would be (1,0,1,0) where the element vectors correspond to channels (3,2,1,0) in that order. We refer to a channel as being "occupied" or "unavailable" with respect to a particular memory line if, within that line, the buffer that corresponds to the channel stores data. We refer to a channel as being "written" with respect to a particular memory line to describe the writing of data within that line into a buffer corresponding to the channel. The relationship between the buffers and the channels is maintained in the Channel Sequence Table, as explained below. The PCO is a four-bit field for each memory line that is maintained in a separate structure called the Policy Control State (PCS) within the PCU.

Figure 4:
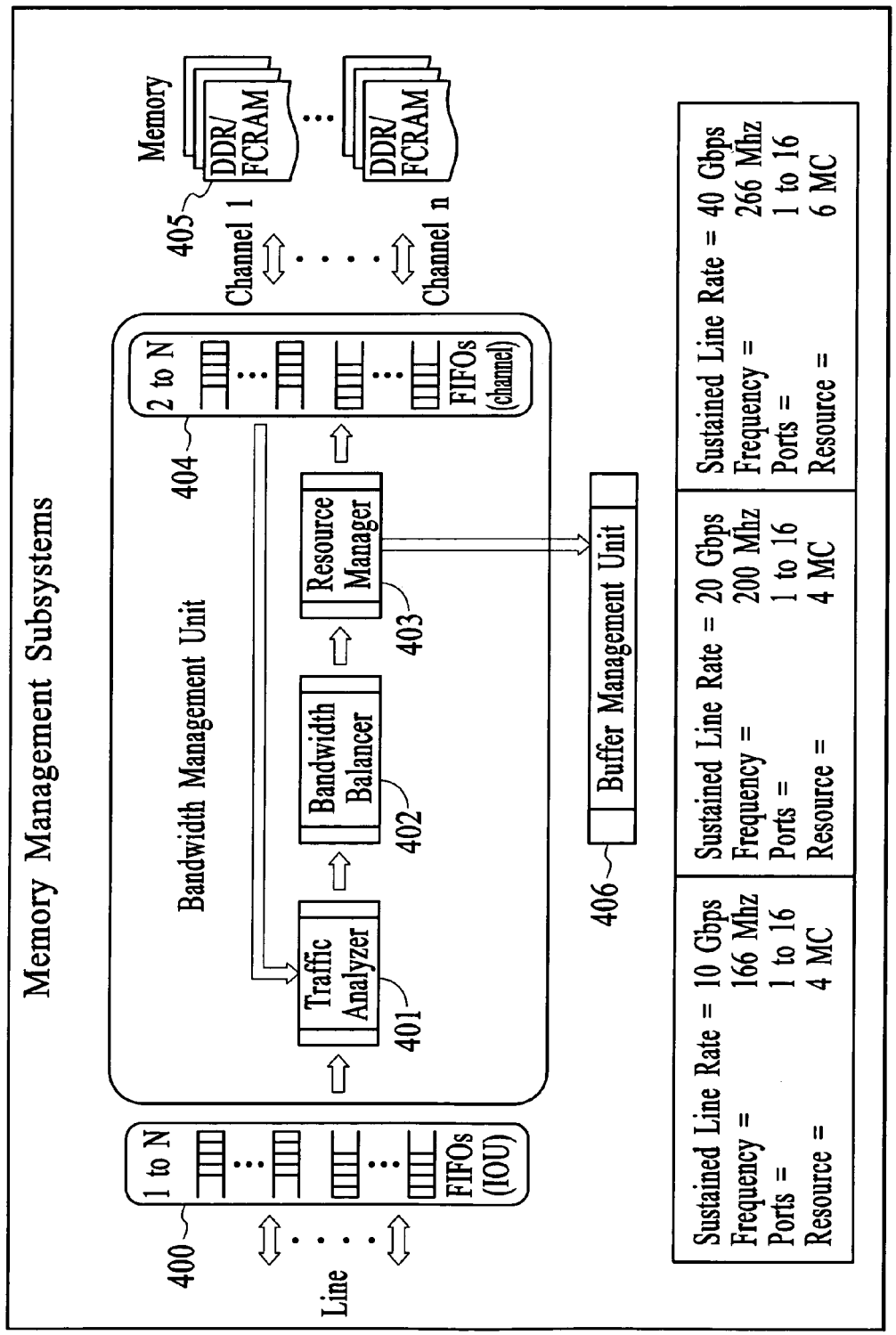
FIG. 4 illustrates an embodiment of a memory management subsystem according to the present invention.

Initially, when the resource manager fetches a new line from the Buffer Management Unit (FIG. 4), the BBA can select any one of the four channels. The corresponding bit in the PCO field is set to logic one to indicate when a particular channel is already occupied. When the next cell or packet segment arrives after the first channel is selected to be written by the BBA, the BBA can select any one of the remaining unoccupied three channels. When only one or two channels left, the selection is constrained to one or two channels.

When the PCO state indicates that there are only one or two channels left and the channel selection does not meet any of the above four balancing criteria, the BBA includes an option to sacrifice one or more buffers (e.g., 64-bytes of the 256 Mbytes of memory) for performance trade off. Under appropriate load conditions, when the channel sacrifice (skipping) option is enabled the resource manager fetches a new memory line pointer (i.e., allocates a new line) and this provides the BBA with four new buffers, one buffer per channel, to choose from instead of one or two. The algorithm can be applied when one or two channels are available from the selection and they do not meet the channel selection criteria. One or two buffers can be sacrificed for performance. In other words, if instead the algorithm stored the data in one of the two remaining buffers, this would load the corresponding channel that stores the data beyond a limit deemed acceptable according to the four balancing criteria.

Buffer Link List

In the architecture of the present invention, the next buffer pointer is stored in the header of the current buffer. The next buffer pointer is written in the header section of the buffer at the same time as the payload using a burst-write transaction. In order for the present invention to enable dynamic channel selection, the payload channel occupancy state information within one memory line cannot reside within the payload buffer header.

The sequence of every four cells or packet segments is dynamic and it is determined by the BBA. The payload channel occupancy state information is kept in a separate data structure.

The method in the present invention uses a separate data structure to maintain the sequence of channel usage. This data structure, called the Channel Sequence Table, is illustrated in the FIG. 6. The CST may be stored in SRAM or embedded DRAM.

Figure 6:
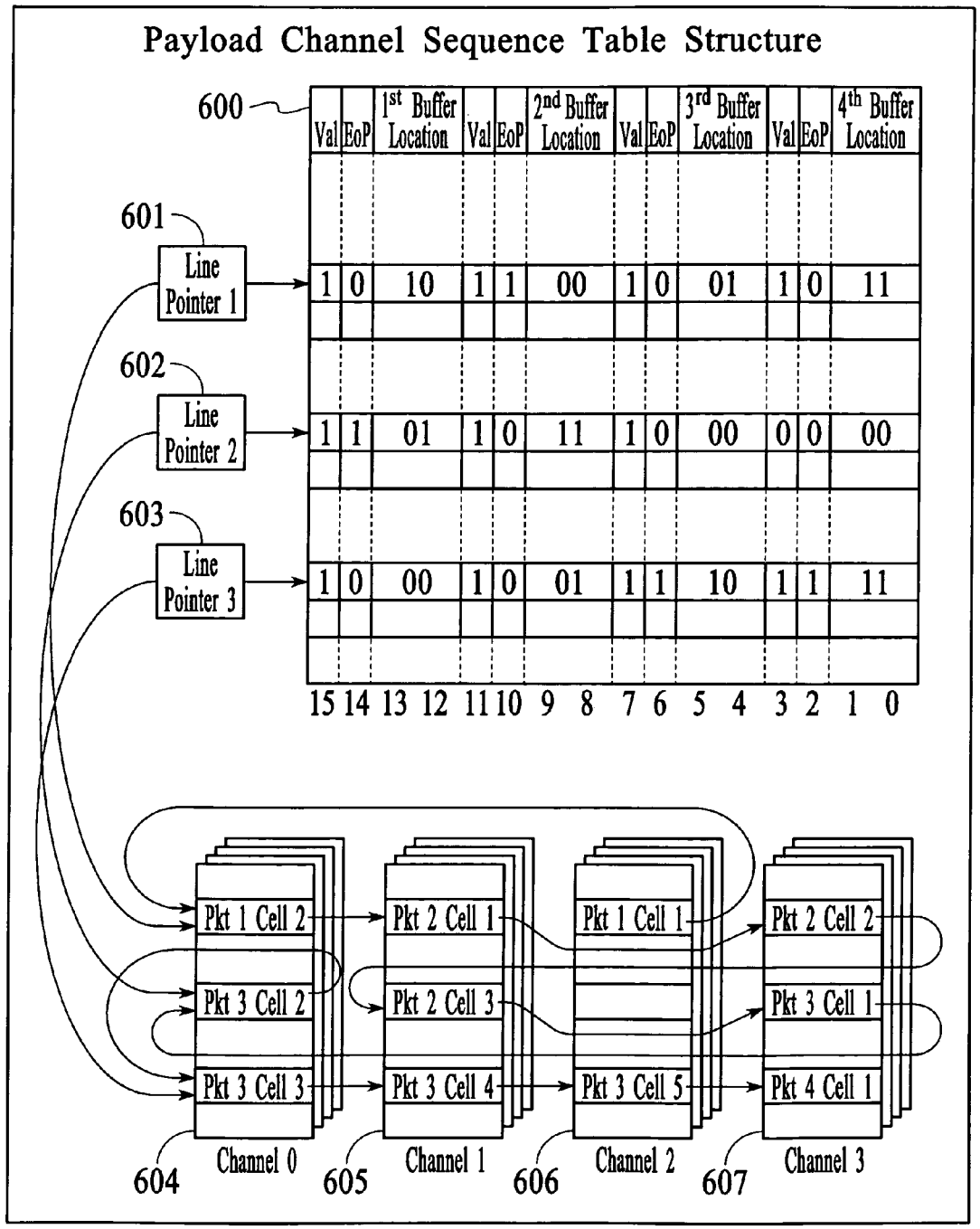
FIG. 6 illustrates an embodiment of a payload channel sequence table according to the present invention.

The CST illustrated in FIG. 6 contains information about the sequence of the channel occupancy within the memory line. In this example, a memory line consists of four 64-byte buffers one buffer from each channel. Since one packet may occupy one or more buffers, the buffer sequence within a packet must be maintained. Initially in this example, buffer one contains the first segment of the packet (packet 1, cell 1), buffer two contains the second segment (packet 1, cell 2) and so forth.

The first buffer location field within the payload channel sequence table in FIG. 6 contains the channel number (represented in binary) to which the first buffer is assigned. The second buffer location contains the channel number where the second buffer resides. The third buffer location contains the channel number where the third buffer resides. Since there will be some occasions that one or two of the buffers within a line are not used because they fail to meet the balancing criteria (and are thus sacrificed), the method uses a valid bit within the CST data structure to indicate whether the buffer is occupied. As illustrated in the second line of the CST, a valid bit of zero for the fourth buffer location indicates that that buffer is being sacrificed.

According to the present invention, the CST serves two purposes. It provides real-time dynamic channel assignment for the BBA. In addition, the CST enables a pre-fetch method for the FPU in the UBR (Unassigned bit rate) or packet mode of operation. In UBR and packet mode, the FPU forwards cells and packets one packet at a time. In conjunction with the first segment of the packet, the FPU can fetch one entry from the Channel Sequence table and know exactly the sequence of channels in which to send the read requests to the DBU to fetch the information from memory in advance. The pre-fetch method in the FPU provides a tremendous increase in throughput especially for large packets spanning more than one memory line or four buffers in this particular example.

The method also uses additional information within the CST, the EOP (End of Packet) field. The PCU sets the value of the EOP bit to one to mark the end of packet. This information allows the FPU to pre-fetch the sequence information until it encounters the buffer with the EOP field set to one.

In the present implementation of this invention, the CST structure resides in a separate memory region. The memory used in this region is the ZBT SRAM, which provides data every cycle. The bandwidth requirement on this interface is 2 reads and 1 write. The PCU does a read-modify-write to update the CST table. The FPU only reads and uses the information contained within the table.

The complete dynamic channel selection process is given by the algorithm illustrated by the flow chart in FIG. 7.

After the information unit (e.g., cell or packet segment) arrives (step 700), the PCU provides the PCO state information to the BBA (step 701) and the BBA reads the values of all the current counters (step 702). The first test the BBA performs is whether the channel sacrifice (skipping) option is enabled (step 703). The option may be enabled by the programmer.

Channel Skipping Not Enabled

If this option is not enabled, the BBA will determine from among the available (unoccupied) channels the channel with the lowest number of pending read requests (step 705).

If only one channel has a lowest read count (step 706), then the BBA will select this channel for storage of the information unit (e.g., packet segment), and indicate in the PCO that the channel is occupied by setting to a logic one an indicator in the appropriate field of the PCO corresponding to the occupied buffer in the memory line (step 719). If the selected channel is not the last channel within the line (step 721), then the algorithm for this information unit ends (step 727), and the BBA will wait for the next information unit to arrive. If the selected channel is the last channel (step 721), then the BBA will fetch a new line pointer (thereby allocating a new line in memory) and initialize the PCO to zero for that line before exiting the algorithm (step 726).

If more than one channel has a lowest read count (step 706), then, from among those channels, the BBA determines which channel has the lowest number of pending write requests (step 707). If only one channel has both the lowest read and write counts (step 708), then the BBA selects this channel for storage of the information unit, and proceeds with the step of marking the PCO (step 719) followed by the other steps implemented above in the case of only one lowest-read count channel (i.e, the last channel test).

If, however, more than one channel has both the lowest read and write counts (step 708), then from among those channels, the BBA determines the channel that has the lowest number of active buffers. If more than one channel matches all three criteria, then the BBA uses a round robin selection from among those channels based upon an ascending or descending order of the channel identification numbers, which are arbitrarily assigned as is well known in the art (step 709). The BBA selects the channel that survives these tests, and marks the PCO accordingly (step 719).

Channel Skipping Enabled

If the channel skipping option is enabled, the BBA will determine the channel with the lowest number of pending read requests (step 704).

If only one channel has a lowest read count (step 711), then the BBA checks using the state information in the PCO whether the channel is available (unoccupied) (step 714). If the channel is available, the BBA selects the channel for storage of the information unit, marks the PCO (step 719) and performs the last channel test (steps 721 and 726, if necessary).

If, however, the lowest-read-count channel is not available (step 714), then the BBA performs a last channel test and fetches a new line if the channel is the last channel (steps 713 and 720). Then the BBA starts again at the first determination of the channel with the lowest read count (step 704) to ultimately determine in which channel of the new line the data should be stored.

If the lowest-read-count channel is not available (step 714) and not the last channel (step 713), the BBA finds the channel with the next lowest read count value (step 712). If (1) there is only one channel with this next lowest-read-count value (step 711), and (2) it is available (step 714), then the BBA selects this channel for storage, marks the PCO accordingly (step 719), and performs the last channel test (steps 721 and 726, if necessary).

If more than one channel has the lowest read count (step 711), then, from among those channels, the BBA determines which channel has the lowest number of pending write requests (step 710). If only one channel has both the lowest read and write counts (step 715), then the BBA determines whether this channel is available (step 718). If it is, then the BBA selects this channel for storage of the information unit, marks the PCO (step 719) and performs the last channel test (steps 721 and 726, if necessary).

If the channel is not available (step 718), then the BBA determines whether that channel is the last channel capable of being assigned in the line (step 722). If it is, then the BBA fetches a new buffer line (step 725). Then the BBA starts again at the first step of determining the channel with the lowest read count (step 704) to ultimately determine in which channel of the new line the data should be stored.

If the channel is not the last channel (step 722), then the BBA finds the channel having both the lowest read count and the next lowest write count (step 717). The BBA then again makes the determination whether there is more than one channel meeting these criteria (step 715), going through the loop again.

If, however, more than one channel has both the lowest read and write counts (step 715), then from among those channels, the BBA determines the channel that has the lowest number of active buffers, or, if more than one channel matches all three criteria, then the BBA uses a round robin selection from among those channels based upon an ascending or descending order of the channel identification numbers (step 716).

The BBA then determines whether the channel that survives all these tests is available (step 723). If it is, then the BBA selects it for storage, marks the PCO (step 719) and performs the last channel test (steps 721 and 726, if necessary). If, however, the channel is not available (step 723), then the BBA determines whether the channel is the last channel in the line (step 724). If it is not the last channel, then the BBA determines the channel having both the lowest read and write counts as well as the next lowest active buffer count, or, if more than one channel matches all three criteria, then the BBA uses a round robin selection from among those channels based upon an ascending or descending order of the channel identification numbers (step 728). The BBA then performs the channel available test again (step 723).

If the channel is the last channel (step 724) then the BBA fetches a new buffer line (step 725). Then the BBA starts again at the first step of determining the channel with the lowest read count (step 704) to ultimately determine in which channel of the new line the data should be stored.

The selection algorithm represented by the above flowchart is only one example of the implementation of the BBA, and should not be viewed as limiting the scope of the invention. The invention can, for example, employ other algorithms using other count mechanisms with a similar or different sequence of tests in order to allocate incoming information units among memory channels.

What is claimed is:

1. A method to optimally access a memory unit where the memory unit is logically partitioned to form a plurality of memory channels, the plurality of memory channels are further logically partitioned to form a plurality of memory lines, each of the plurality of memory lines includes a plurality of buffers and each of the plurality of buffers corresponds to a separate one of the plurality of memory channels, comprising:

determining at least one load value of each of the plurality of memory channels; and based on the determined at least one load value, selecting a particular one of the plurality of memory channels;

wherein the step of determining the at least one load value of each of the plurality of memory channels includes determining, for each of the plurality of memory channels, the number of pending read requests;

wherein the step of selecting the particular one of the plurality of memory channels includes selecting the particular one of the plurality of memory channels that has a lowest number of pending read requests.

2. The method of claim 1 wherein the step of determining the at least one load value of each of the plurality of memory channels includes determining, for each of the plurality of memory channels, at least one of the number of pending write requests, and the number of active buffers which is the number of a particular one of the plurality of buffers that is unavailable and corresponds to the particular one of the plurality of memory channels in each of the plurality of memory lines.

3. The method of claim 1 wherein the step of selecting the particular one of the plurality of memory channels includes selecting the particular one of the plurality of memory channels that has at least one of a lowest number of pending write requests, a lowest number of active buffers, and a corresponding channel identification number that is next in a round robin scheme.

4. The method of claim 1 wherein the memory unit is a plurality of dynamic random access memory units.

5. The method of claim 1 wherein each of the plurality of buffers has a fixed-size.

6. The method of claim 4 further comprising
receiving an incoming information element;
if the size of the information element is greater than the fixed-size of each of the plurality of buffers, dividing the information element into a plurality of information element segments, each of the plurality of information element segments having a size less than or equal to the fixed-size of each of the at least one buffer; and
storing at least one of the information element and a particular one of the plurality of information element segments within a particular one of the plurality of buffers corresponding to the selected one of the plurality of memory channels at a particular one of the plurality of memory lines.

7. The method of claim 1 wherein each of the plurality of memory channels has a width equal to a width of the memory unit divided by the number of the plurality of memory channels.

8. A method to optimally access a single hierarchical level memory unit, where the memory unit is logically partitioned to form a plurality of memory channels, the plurality of memory channels are further logically partitioned to form a plurality of memory lines, each of the plurality of memory lines includes a plurality of buffers and each of the plurality of buffers corresponds to a separate one of the plurality of memory channels, comprising:
determining, for each of the plurality of memory channels, the number of pending read requests, the number of pending write requests, and the number of active buffers which is the number of a particular one of the plurality of buffers that is unavailable and corresponds to the particular one of the plurality of memory channels in each of the plurality of memory lines; and
selecting a particular one of the plurality of memory channels that has at least one of a lowest number of pending read requests, a lowest number of pending write requests, a lowest number of active buffers, and a corresponding channel identification number that is next in a round robin scheme.

9. The method of claim 8 wherein each of the plurality of buffers has a fixed-size.

10. The method of claim 9 further comprising
receiving an incoming information element;
if the size of the information element is greater than the fixed-size of each of the plurality of buffers, dividing the information element into a plurality of information element segments, each of the plurality of information element segments having a size less than or equal to the fixed-size of each of the at least one buffer; and
storing at least one of the information element and a particular one of the plurality of information element segments within a particular one of the plurality of buffers corresponding to the selected one of the plurality of memory channels at a particular one of the plurality of memory lines.

11. The method of claim 10 wherein the step of selecting the particular one of the plurality of memory channels includes
finding a first subset of the plurality of memory channels that is available at the particular one of the plurality of memory lines and has a lowest number of the pending read requests;
if the number of memory channels within the first subset of the plurality of memory channels equals one, setting the selected one of the plurality of memory channels to the first subset of the plurality of memory channels;
if the number of memory channels within the first subset of the plurality of memory channels is greater than one, then finding a second subset of the plurality of memory channels within the first subset of the plurality of memory channels that has the lowest number of the pending write requests;
if the number of memory channels within the second subset of the plurality of memory channels equals one, setting the selected one of the plurality of memory channels to the second subset of the plurality of memory channels;
if the number of memory channels within the second subset of the plurality of memory channels is greater than one, then finding a third subset of the plurality of memory channels within the second subset of the plurality of memory channels that has the lowest number of active buffers;
if the number of memory channels within the third subset of the plurality of memory channels equals one, setting the selected one of the plurality of memory channels to the third subset of the plurality of memory channels; and
if the number of memory channels within the third subset of the plurality of memory channels is greater than one, setting the selected one of the plurality of memory channels to a particular one of the third subset of the plurality of memory channels that has a corresponding channel identification number that is next in a round robin scheme.

12. The method of claim 10 wherein the step of selecting the particular one of the plurality of memory channels includes
finding a first subset of the plurality of memory channels that has a lowest number of the pending read requests;
if the number of memory channels within the first subset of the plurality of memory channels equals one,
determining if the first subset of the plurality of memory channels at the particular one of the plurality of memory lines is available;
if the first subset of the plurality of memory channels at the particular one of the plurality of memory lines is available, setting the selected one of the plurality of memory channels to the first subset of the plurality of memory channels; and
if the first subset of the plurality of memory channels at the particular one of the plurality of memory lines is not available,
determining if at least one of the information element and the particular one of the plurality of information element segments can be stored within any remaining one of the plurality of memory channels at the particular one of the plurality of memory lines without overloading that memory channel;

if at least one of the information element and the particular one of the plurality of information element segments can be stored within any remaining one of the plurality of memory channels, finding a second subset of the plurality of memory channels that has a next lowest number of the pending read requests; and if at least one of the information element and the particular one of the plurality of information element segments cannot be stored within any remaining one of the plurality of memory channels, fetching a new one of the plurality of memory lines; and if the number of memory channels within the first subset of the plurality of memory channels is greater than one, setting the selected one of the plurality of memory channels to a particular one of the first subset of the plurality of memory channels that has at least one of a lowest number of pending write requests, a lowest number of active buffers, and a corresponding channel identification number that is next in a round robin scheme.

13. The method of claim 10 further comprising, upon storing at least one of the information element and the particular one of the plurality of information element segments within the particular one of the plurality of buffers corresponding to the selected one of the plurality of memory channels, setting a particular one of a plurality of payload channel occupancy bits that corresponds to the selected one of the plurality of memory channels.

14. The method of claim 10 further comprising, reading the plurality of payload channel occupancy bits to determine if a corresponding one of the plurality of memory channels is available.

15. The method of claim 10 further comprising, upon storing at least one of the information element and the particular one of the plurality of information element segments within the particular one of the plurality of buffers corresponding to the selected one of the plurality of memory channels at the particular one of the plurality of memory lines, writing a channel identification number corresponding to the selected one of the plurality of memory channels to a buffer location field within a payload channel sequence table that corresponds to the particular one of the plurality of buffers.

16. The method of claim 15 further comprising, upon storing at least one of the information element and the particular one of the plurality of information element segments within the particular one of the plurality of buffers corresponding to the selected one of the plurality of memory channels at the particular one of the plurality of memory lines, setting a value field within the payload channel sequence table that corresponds to the particular one of the plurality of buffers.

17. The method of claim 16 further comprising, upon storing at least one of the information element and the particular one of the plurality of information element segments within the particular one of the plurality of buffers corresponding to the selected one of the plurality of memory channels at the particular one of the plurality of memory lines, if the data within the particular one of the plurality of buffers signals an end-of-packet, setting an end-of-packet field corresponding to the particular one of the plurality of buffers within the payload channel sequence table.

18. The method of claim 17 further comprising fetching at least one of the information element and a portion of the information element by determining at least one memory channel that stores at least one of the information element and the portion of the information element by reading the buffer location field corresponding to each of the plurality of buffers at a particular one of the plurality of memory lines until an end-of-packet field corresponding to that buffer signals the end-of-packet; and reading the contents of each of an at least one buffer of the plurality of buffers at a particular one of the plurality of memory lines corresponding to each of the at least one memory channel.

19. The method of claim 8 wherein the single hierarchical level memory unit is a plurality of dynamic random access memory units.

20. A system to optimally access a memory unit, comprising:

the memory unit that is logically partitioned to form a plurality of memory channels;

a traffic analyzer to determine at least one load of each of the plurality of memory channels; and a bandwidth balancer to select a particular one of the plurality of memory channels based on the determined at least one load;

wherein the traffic analyzer includes:

a plurality of pending write request counters to measure write request loads on the plurality of channels, each of the plurality of pending write request counters corresponds to a separate one of the plurality of write request quees;

a plurality of pending read request counters to measure read request loads on the plurality of channels, each of the plurality of pending read request counters corresponds to a separate one of the plurality of read request queues; and a plurality of active buffer counters to measure stored data loads on the plurality of channels, each of the plurality of active buffer counters corresponds to a separate one of the plurality of write request queues that in turn corresponds to a particular one of the plurality of memory channels and each of the plurality of active buffer counters also corresponds to a separate one of the plurality of read request queues that in turn corresponds to the particular one of the plurality of memory channels.

21. The system of claim 20 wherein the plurality of memory channels of the memory unit are further logically partitioned to form a plurality of memory lines, each of the plurality of memory lines includes a plurality of buffers and each of the plurality of buffers corresponds to a separate one of the plurality of memory channels.

22. The system of claim 21 further comprising a payload channel occupancy vector, each element of the payload channel occupancy vector corresponds to a separate one of the plurality of buffers at a particular one of the plurality of memory lines and each element of the payload channel occupancy vector indicates if a corresponding one of the plurality of memory buffers is available.

23. The system of claim 21 further comprising a buffer management unit to provide a pointer to a new one of the plurality of memory lines.

24. The system of claim 20 further comprising a plurality of write payload channel queues, each of the plurality of write payload channel queues corresponds to a separate one of the plurality of memory channels, each of the plurality of write payload channel queues stores at least one of an information element and a particular one of the information element segments to be written to a corresponding one of the plurality of memory channels;

a plurality of write request queues, each of the plurality of write request queues corresponds to a separate one of the plurality of write payload channel queues, a particular one of the plurality of write request queues stores a request to write the data within a corresponding one of the plurality of write payload channel queues to a corresponding one of the plurality of memory channels of the memory unit;

a plurality of read payload channel queues, each of the plurality of read payload channel queues corresponds to a separate one of the plurality of memory channels, each of the plurality of read payload channel queues stores at least one of an information element and a particular one of the information element segments that is retrieved from the memory unit; and a plurality of read request queues, each of the plurality of read request queues corresponds to a separate one of the plurality of read payload channel queues, a particular one of the plurality of read request queues stores a request to retrieve from a corresponding one of the plurality of memory channels of the memory unit at least one of the information element and the particular one of the information element segments and store it in a corresponding one of the plurality of read payload channel queues.

25. The system of claim 20 wherein a particular one of the plurality of pending write request counters is incremented upon a corresponding one of the plurality of write request queues receiving a write request and decremented upon extracting the write request from the corresponding one of the plurality of write request queues;

a particular one of the plurality of pending read request counters is incremented upon a corresponding one of the plurality of read request queues receiving a read request and decremented upon extracting the read request from the corresponding one of the plurality of read request queues; and a particular one of the plurality of active buffer counters is incremented upon a corresponding one of the plurality of write request queues receiving the write request and decremented upon a corresponding one of the plurality of read request queues receiving the read request.

26. The system of claim 20 further comprising a payload channel sequence table to specify at least one memory channel of the plurality of memory channels at which at least one of the information element and a portion of the information element is stored.

27. The system of claim 26 wherein the payload channel sequence table is partitioned to form a plurality of columns, each of the plurality of columns corresponds to a separate one of the plurality of memory channels, the plurality of columns are further partitioned to form a plurality of rows, each of the plurality of tows includes a plurality of buffer information units and each of the plurality of buffer information units includes a buffer location field that specifies a particular one of the plurality of memory channels at which a particular one of the plurality of buffers at a particular one of the plurality of memory lines stores at least one of the information element and a particular one of the plurality of information element segments;

a value field that indites whether the particular one of the plurality of buffers corresponding to the particular one of the plurality of memory channels at the particular one of the plurality of memory lines stores any data within that buffer, and an end-of-packet field that indicates whether the particular one of the plurality of buffers corresponding to the particular one of the plurality of memory channels at the particular one of the plurality of memory lines stores data that signals an end-of-packet.

28. The system of claim 20 wherein the memory unit is a plurality of dynamic random access memory units.

29. The system of claim 20 wherein each of the plurality of buffers has a length that is a fixed-size.

30. The system of claim 29 wherein each of the plurality of memory channels has a width that is the fixed-size.

31. A system to optimally access a memory unit comprising:

the memory unit that is logically partitioned to form a plurality of memory channels;

a bandwidth management unit that includes
a traffic analyzer to determine at least one load of each of the plurality of memory channels; and
a bandwidth balancer to select a particular one of the plurality of memory channels based on the determined at least one load;

a policy control unit to provide at least one of an information element and a particular one of a plurality of information element segments for writing to the selected one of the plurality of memory channels;

a data buffer unit to temporarily store at least one of the information element and the particular one of the plurality of information element segments within a particular one of a plurality of write payload channel queues that corresponds to the selected one of the plurality of memory channels and writes the temporarily stored data to the selected one of the plurality of memory channels within the memory unit; and a forward processing unit that fetches at least one buffer of the plurality of buffers within the memory unit.

32. The system of claim 31 wherein the forward processing unit includes a plurality of read payload channel queues, each of the plurality of read payload channel queues corresponds to a separate one of the plurality of memory channels, each of the plurality of read payload channel queues stores at least one of an information element and a particular one of the information element segments that is retrieved from the memory unit; and a plurality of read request queues, each of the plurality of read request queues corresponds to a separate one of the plurality of read payload channel queues, a particular one of the plurality of read request queues stores a request to retrieve from a corresponding one of the plurality of memory channels of the memory unit at least one of the information element and the particular one of the information element segments and store it in a corresponding one of the plurality of read payload channel queues.

33. The system of claim 32 further comprising a payload channel sequence table to specify an at least one memory channel of the plurality of memory channels at which at least one of the information element and a portion of the information element is stored.

34. The system of claim 33 wherein the payload channel sequence table is partitioned to form a plurality of columns, each of the plurality of columns corresponds to a separate one of the plurality of memory channels, the plurality of columns are further partitioned to form a plurality of rows, each of the plurality of rows includes a plurality of buffer information units and each of the plurality of buffer information units includes a buffer location field that specifies a particular one of the plurality of memory channels at which a particular one of the plurality of buffers at a particular one of the plurality of memory lines stores at least one of the information element and a particular one of the plurality of information element segments;

a value field that indicates whether the particular one of the plurality of buffers corresponding to the particular one of the plurality of memory channels at the particular one of the plurality of memory lines stores any data within that buffer; and an end-of-packet field that indicates whether the particular one of the plurality of buffers corresponding to the particular one of the plurality of memory channels at the particular one of the plurality of memory lines stores data that signals an end-of-packet.

35. The system of claim 34 wherein the forward processing unit fetches at least one of the information element and the portion of the information element by determining at least one memory channel that stores the at least one of the information element and the portion of the information element by traversing each of the plurality of buffer information units within a particular one of the plurality of rows of the payload channel sequence table and retrieving the particular one of the plurality of memory channels specified within the buffer location field until the end-of-packet field of that buffer information unit signals the end-of-packet; and for each of the at least one memory channel, sending a read request to a particular one of the plurality of read request queues that corresponds to that memory channel.

36. The system of claim 32 wherein the forward processing unit fetches at least one of the information element and the portion of the information element by accessing the payload channel sequence table to determine at least one memory channel within which at least one of the information element and the portion of the information element is stored, and for each of the at least one memory channel, sending a read request to a particular one of the plurality of read request queues that corresponds to that memory channel.

37. A program storage device readable by a computer system, storing a plurality of instructions to optimally access a memory unit where the memory unit is logically partitioned to form a plurality of memory channels, the plurality of memory channels are further logically partitioned to form a plurality of memory lines, each of the plurality of memory lines includes a plurality of buffers and each of the plurality of buffers corresponds to a separate one of the plurality of memory channels, comprising:

instructions for determining at least one load value of each of the plurality of memory channels; and instructions for selecting a particular one of the plurality of memory channels based on the determined at least one load value;

wherein the instructions for determining the at least one load value of each of the plurality of memory channels includes instructions for determining, for each of the plurality of memory channels, the number of pending read requests, the number of pending write requests, and the number of active buffers which is the number of a particular one of the plurality of buffers that is unavailable and corresponds to the particular one of the plurality of memory channels in each of the plurality of memory lines.

38. The device of claim 37 wherein the instructions for selecting the particular one of the plurality of memory channels includes instructions for selecting the particular one of the plurality of memory channels that has at least one of a lowest number of pending read requests, a lowest number of pending write requests, a lowest number of active buffers, and a corresponding channel identification number that is next in a round robin scheme.

39. A method to optimally access a single hierarchical level memory unit, where the memory unit is logically partitioned to form a plurality of memory channels, the plurality of memory channels are further logically partitioned to form a plurality of memory lines, each of the plurality of memory lines includes a plurality of buffers and each of the plurality of buffers corresponds to a separate one of the plurality of memory channels, comprising:

determining, for each of the plurality of memory channels, at least one of the number of pending read requests, the number of pending write requests, and the number of active buffers which is the number of a particular one of the plurality of buffers that is unavailable and corresponds to the particular one of the plurality of memory channels in each of the plurality of memory lines; and selecting a particular one of the plurality of memory channels that has at least one of a lowest number of pending read requests, a lowest number of pending write requests, a lowest number of active buffers, and a corresponding channel identification number that is next in a round robin scheme;

wherein each of the plurality of buffers has a fixed-size; and further comprising receiving an incoming information element;

if the size of the information element is greater than the fixed-size of each of the plurality of buffers, dividing the information element into a plurality of information element segments, each of the plurality of information element segments having a size less than or equal to the fixed-size of each of the at least one buffer; and storing at least one of the information element and a particular one of the plurality of information element segments within a particular one of the plurality of buffers corresponding to the selected one of the plurality of memory channels at a particular one of the plurality of memory lines;

wherein the step of selecting the particular one of the plurality of memory channels includes finding a first subset of the plurality of memory channels that is available at the particular one of the plurality of memory lines and has a lowest number of the pending read requests;

if the number of memory channels within the first subset of the plurality of memory channels equals one, setting the selected one of the plurality of memory channels to the first subset of the plurality of memory channels;

if the number of memory channels within the first subset of the plurality of memory channels is greater than one, then finding a second subset of the plurality of memory channels within the first subset of the plurality of memory channels that has the lowest number of the pending write requests;

if the number of memory channels within the second subset of the plurality of memory channels equals one, setting the selected one of the plurality of memory channels to the second subset of the plurality of memory channels;

if the number of memory channels within the second subset of the plurality of memory channels is greater than one, then finding a third subset of the plurality of memory channels within the second subset of the plurality of memory channels that has the lowest number of active buffers;

if the number of memory channels within the third subset of the plurality of memory channels equals one, setting the selected one of the plurality of memory channels to the third subset of the plurality of memory channels; and if the number of memory channels within the third subset of the plurality of memory channels is greater than one, setting the selected one of the plurality of memory channels to a particular one of the third subset of the plurality of memory channels that has a corresponding channel identification number that is next in a round robin scheme.

40. A method to optimally access a single hierarchical level memory unit, where the memory unit is logically partitioned to form a plurality of memory channels, the plurality of memory channels are further logically partitioned to form a plurality of memory lines, each of the plurality of memory lines includes a plurality of buffers and each of the plurality of buffers corresponds to a separate one of the plurality of memory channels, comprising:

determining, for each of the plurality of memory channels, at least one of the number of pending read requests, the number of pending write requests, and the number of active buffers which is the number of a particular one of the plurality of buffers that is unavailable and corresponds to the particular one of the plurality of memory channels in each of the plurality of memory lines; and selecting a particular one of the plurality of memory channels that has at least one of a lowest number of pending read requests, a lowest number of pending write requests, a lowest number of active buffers, and a corresponding channel identification number that is next in a round robin scheme;

wherein each of the plurality of buffers has a fixed-size; and further comprising receiving an incoming information element;

if the size of the information element is greater than the fixed-size of each of the plurality of buffers, dividing the information element into a plurality of information element segments, each of the plurality of information element segments having a size less than or equal to the fixed-size of each of the at least one buffer; and storing at least one of the information element and a particular one of the plurality of information element segments within a particular one of the plurality of buffers corresponding to the selected one of the plurality of memory channels at a particular one of the plurality of memory lines;

wherein the step of selecting the particular one of the plurality of memory channels includes finding a first subset of the plurality of memory channels that has a lowest number of the pending read requests;

if the number of memory channels within the first subset of the plurality of memory channels equals one, determining if the first subset of the plurality of memory channels at the particular one of the plurality of memory lines is available;

if the first subset of the plurality of memory channels at the particular one of the plurality of memory lines is available, setting the selected one of the plurality of memory channels to the first subset of the plurality of memory channels; and if the first subset of the plurality of memory channels at the particular one of the plurality of memory lines is not available, determining if at least one of the information element and the particular one of the plurality of information element segments can be stored within any remaining one of the plurality of memory channels at the particular one of the plurality of memory lines without overloading that memory channel;

if at least one of the information element and the particular one of the plurality of information element segments can be stored within any remaining one of the plurality of memory channels, finding a second subset of the plurality of memory channels that has a next lowest number of the pending read requests; and if at least one of the information element and the particular one of the plurality of information element segments cannot be stored within any remaining one of the plurality of memory channels, fetching a new one of the plurality of memory lines; and if the number of memory channels within the first subset of the plurality of memory channels is greater than one, setting the selected one of the plurality of memory channels to a particular one of the first subset of the plurality of memory channels that has at least one of a lowest number of pending write requests, a lowest number of active buffers, and a corresponding channel identification number that is next in a round robin scheme.

41. A method to optimally access a single hierarchical level memory unit, where the memory unit is logically partitioned to form a plurality of memory channels, the plurality of memory channels are further logically partitioned to form a plurality of memory lines, each of the plurality of memory lines includes a plurality of buffers and each of the plurality of buffers corresponds to a separate one of the plurality of memory channels, comprising:

determining, for each of the plurality of memory channels, at least one of the number of pending read requests, the number of pending write requests, and the number of active buffers which is the number of a particular one of the plurality of buffers that is unavailable and corresponds to the particular one of the plurality of memory channels in each of the plurality of memory lines; and selecting a particular one of the plurality of memory channels that has at least one of a lowest number of pending read requests, a lowest number of pending write requests, a lowest number of active buffers, and a corresponding channel identification number that is next in a round robin scheme;

wherein each of the plurality of buffers has a fixed-size; and further comprising receiving an incoming information element;

if the size of the information element is greater than the fixed-size of each of the plurality of buffers, dividing the information element into a plurality of information element segments, each of the plurality of information element segments having a size less than or equal to the fixed-size of each of the at least one buffer; and storing at least one of the information element and a particular one of the plurality of information element segments within a particular one of the plurality of buffers corresponding to the selected one of the plurality of memory channels at a particular one of the plurality of memory lines;

further comprising, upon storing at least one of the information element and the particular one of the plurality of information element segments within the particular one of the plurality of buffers corresponding to the selected one of the plurality of memory channels at the particular one of the plurality of memory lines, writing a channel identification number corresponding to the selected one of the plurality of memory channels to a buffer location field within a payload channel sequence table that corresponds to the particular one of the plurality of buffers.

42. A system to optimally access a memory unit, comprising:

the memory unit that is logically partitioned to form a plurality of memory channels;

a traffic analyzer to determine at least one load of each of the plurality of memory channels;

a bandwidth balancer to select a particular one of the plurality of memory channels based on the determined at least one load;

a plurality of write payload channel queues, each of the plurality of write payload channel queues corresponds to a separate one of the plurality of memory channels, each of the plurality of write payload channel queues stores at least one of an information element and a particular one of the information element segments to be written to a corresponding one of the plurality of memory channels;

a plurality of write request queues, each of the plurality of write request queues corresponds to a separate one of the plurality of write payload channel queues, a particular one of the plurality of write request queues stores a request to write the data within a corresponding one of the plurality of write payload channel queues to a corresponding one of the plurality of memory channels of the memory unit;

a plurality of read payload channel queues, each of the plurality of read payload channel queues corresponds to a separate one of the plurality of memory channels, each of the plurality of read payload channel queues stores at least one of an information element and a particular one of the information element segments that is retrieved from the memory unit; and a plurality of read request queues, each of the plurality of read request queues corresponds to a separate one of the plurality of read payload channel queues, a particular one of the plurality of read request queues stores a request to retrieve from a corresponding one of the plurality of memory channels of the memory unit at least one of the information element and the particular one of the information element segments and store it in a corresponding one of the plurality of read payload channel queues.

43. A system to optimally access a memory unit, comprising:

the memory unit that is logically partitioned to form a plurality of memory channels;

a traffic analyzer to determine at least one load of each of the plurality of memory channels; and a bandwidth balancer to select a particular one of the plurality of memory channels based on the determined at least one load;

wherein the plurality of memory channels of the memory unit are further logically partitioned to form a plurality of memory lines, each of the plurality of memory lines includes a plurality of buffers and each of the plurality of buffers corresponds to a separate one of the plurality of memory channels; and further comprising a payload channel occupancy vector, each element of the payload channel occupancy vector corresponds to a separate one of the plurality of buffers at a particular one of the plurality of memory lines and each element of the payload channel occupancy vector indicates if a corresponding one of the plurality of memory buffers is available.

44. A system to optimally access a memory unit, comprising:

the memory unit that is logically partitioned to form a plurality of memory channels;

a traffic analyzer to determine at least one load of each of the plurality of memory channels;

a bandwidth balancer to select a particular one of the plurality of memory channels based on the determined at least one load;

wherein the plurality of memory channels of the memory unit are further logically partitioned to form a plurality of memory lines, each of the plurality of memory lines includes a plurality of buffers and each of the plurality of buffers corresponds to a separate one of the plurality of memory channels; and further comprising a buffer management unit to provide a pointer to a new one of the plurality of memory lines.

* * * * *